United States Patent [19]

Fujii et al.

[11] Patent Number: 4,502,820

[45] Date of Patent: Mar. 5, 1985

[54] HIGH-PRESSURE CONVEYOR FOR POWDERY AND GRANULAR MATERIALS

[75] Inventors: Shuzo Fujii; Hideo Oishe; Takashi Moriyama, all of Tokyo, Japan

[73] Assignee: Denka Engineering Kabushiki Kaisha, Tokyo, Japan

[21] Appl. No.: 408,303

[22] Filed: Aug. 16, 1982

[51] Int. Cl.³ .............................................. B65G 53/48
[52] U.S. Cl. ....................................... 406/56; 406/123; 406/138; 222/272; 222/382; 222/413
[58] Field of Search .................... 406/55, 56, 60, 61, 406/123, 138; 414/218; 198/558; 222/252, 265, 269, 271, 272, 382, 412, 413, 195

[56] References Cited

U.S. PATENT DOCUMENTS

| | | | |
|---|---|---|---|
| 2,132,980 | 10/1938 | Woolley et al. | 406/61 X |
| 3,722,715 | 3/1973 | Young | 222/413 X |
| 4,089,563 | 5/1978 | Neu | 406/138 X |
| 4,140,214 | 2/1979 | Pellhammer | 222/272 X |

FOREIGN PATENT DOCUMENTS

| | | | |
|---|---|---|---|
| 268109 | 3/1964 | Australia | 198/558 |
| 403636 | 6/1966 | Switzerland | 406/56 |

*Primary Examiner*—Jeffrey V. Nase
*Attorney, Agent, or Firm*—Sughrue, Mion, Zinn, Macpeak and Seas

[57] ABSTRACT

A high-pressure conveyor discharges a powdery or granular material from a pressurization tank through a discharge unit into a conveyor pipe. The discharge unit includes a guide cylinder or trough mounted on the tank, a screw feeder extending through the guide cylinder and having an end extending into the tank in overhanging relation to an aerator in the tank and the other end coupled to a variable-speed drive unit such as a motor. The material as it is fluidized on the aerator under a high pressure is supplied into the discharge cylinder, from which the material is fed by the screw feeder out of a discharge port in the guide cylinder into the conveyor pipe. A plurality of discharge units may be connected to the tank at angularly spaced intervals for uniform or adjusted distribution of the material to a plurality of locations.

1 Claim, 2 Drawing Figures

HIGH-PRESSURE CONVEYOR FOR POWDERY AND GRANULAR MATERIALS

BACKGROUND OF THE INVENTION

The present invention relates to an apparatus for conveying a powdery or granular material from a pressurization tank on a high-pressure gas at a constant rate of supply for direct distribution among conveyor pipes.

Various efforts have heretofore been made to improve apparatus for conveying powdery and granular materials through conveyor pipes on a conveyor gas such as air or an inert gas. The principal aim of the prior attempts thus far made has been to convey materials through the conveyor pipe at a high gas-solid ratio for the purpose of energy savings. With a wider variety of applications found for pneumatic conveyance, however, there has been a demand for material discharge at a constant rate and simultaneous uniform discharge to a plurality of locations.

The constant-rate discharge of powdery and granular materials has been realized by either a rotary valve disposed between a pressurization tank and a conveyor pipe or a fixed restrictor such as an ejector having a cross-sectional area smaller than that of the conveyor pipe. The rotary valve is however disadvantageous in that its rotor is filled with a powder or granular material varying in amount with the amount of the material stored in the pressurization tank, that is, the amount of the material filled in the rotor of the rotary valve varies with the pressure which the material undergoes in the tank. Furthermore, the rotor includes a plurality of chambers which cause the powdery or granular material to be supplied intermittently into the conveyor pipe. Such intermittent supply of the material manifests itself particularly when the rotor rotates at a slow rate of speed.

The reduced cross-sectional area provided by the fixed restrictor requires that the material be conveyed under higher pressure than the material would be discharged under normal pressure. Since the material flows at a higher speed through the restrictor, the restrictor is subjected to wear and the speed of discharge of the material varies with time. The speed of discharge which is required in reality should be found through a trial-and-error procedure in which several different shapes for such a reduced cross-sectional area have to be tested. The other problem with the fixed restrictor is that one type of fixed restrictor fails to meet the requirements of powdery and granular materials of different natures.

Presently available systems for distributing a powdery and granular material uniformly to a plurality of locations include a single pressurization tank and a plurality of conveyor pipes connected to the pressurization tank, or a plurality of pressurization tanks and a single conveyor pipe coupled thereto. Installation of a fixed restrictor in each of the conveyor pipes results in the same difficulties as described above. According to another arrangement which utiles no such fixed restrictor, the length of the conveyor pipe or pipes is required to be adjusted so as to adjust the pressure loss in each conveyor pipe for uniform material distribution. This alternative system puts limitations on the route along which the conveyor pipe or pipes are installed.

SUMMARY OF THE INVENTION

It is an object of the present invention to provide a high-pressure conveyor for powdery and granular materials which will eliminate the conventional shortcomings.

According to the present invention, a conveyor for conveying a powdery or granular material on a gas at a high pressure of 2 Kg/cm$^2$·G or higher, comprises a pressurization tank having an aerator for storing the powdery or granular material therein, at least one discharge unit connected to the pressurization tank and including a guide cylinder mounted on the pressurization tank and having a discharge port, and a screw feeder having a longitudinally intermediate portion coaxially disposed in the guide cylinder, a first end extending out of the guide cylinder into the pressurization tank in overhanging relation to the aerator, and a second end remote from the first end projecting out of the guide cylinder, a variable-speed drive unit coupled to the second end of the screw feeder for rotating the latter, a conveyor pipe connected to the discharge port for conveying the material supplied from the discharge unit on the gas fed to the conveyor pipe, and a piping connected to the tank and conveyor pipe for supplying the gas into the tank above and below the aerator to fluidize the material under the high pressure and for supplying the gas into the conveyor pipe. A plurality of conveyor pipes may be connected to the pressurization tank for uniformly or adjustably distributing the powdery or granular material to a plurality of locations through a plurality of conveyor pipes.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
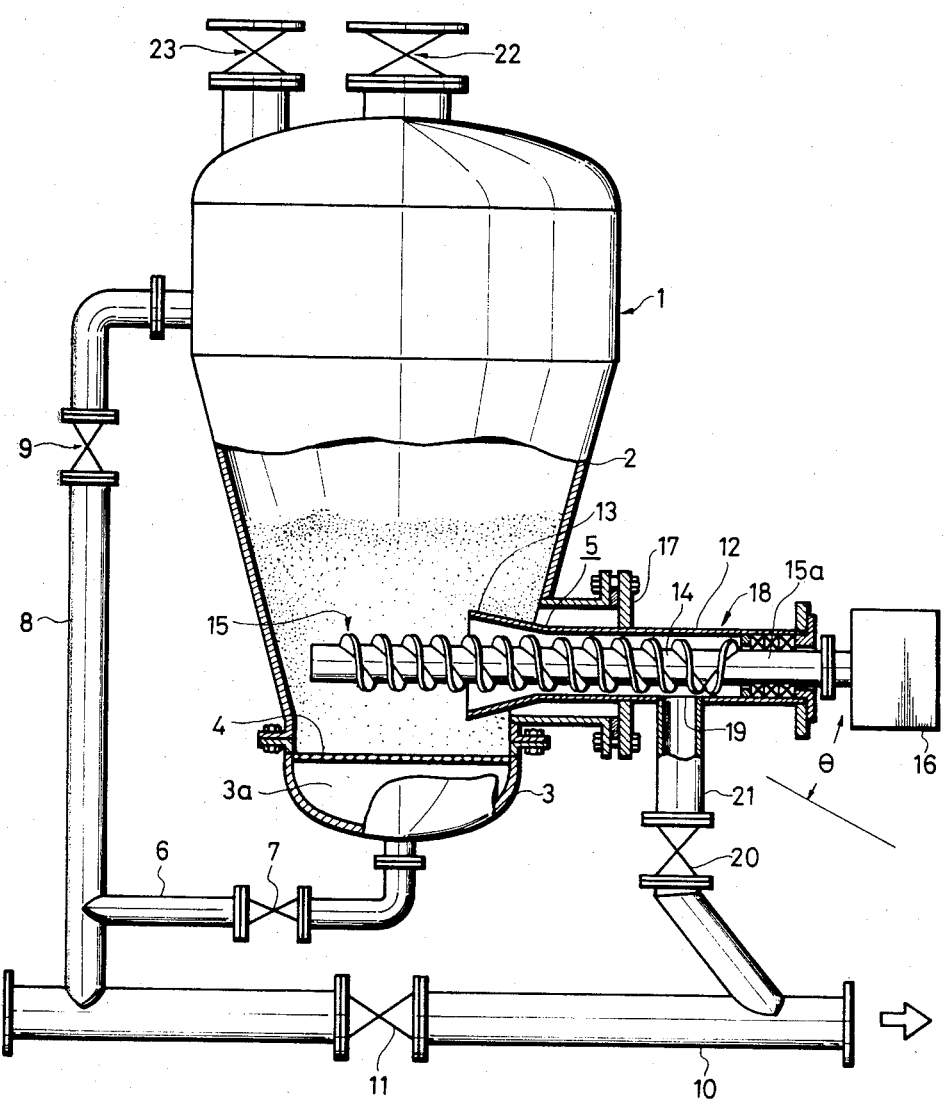
FIG. 1 is a front elevational view, partly cut away, of a high-pressure conveyor according to the present invention.

As shown in FIG. 1, a powdery or granular material is contained in a pressurization tank 1 having a barrel 2 and a bottom 3 defining an air chamber 3a bounded by a porous aerator 4. A discharge unit 5 (only one shown in FIG. 1) extends through the barrel 2 in overhanging relation to the porous aerator 4.

A gas under pressure is supplied from a pressurization source (not shown) to a conveyor pipe 10 from which the gas is fed through an adjustable conveyor valve 11 and branch pipes 6, 8 having adjustable pressurization and uniform-pressure valves 7, 9, respectively, to the air chamber 3a and an upper portion of the tank 1.

The discharge unit 5 includes a screw feeder 14 having a distal end 15 projecting into the tank 1 in overhanging relation to the aerator 4 and a proximal end coupled to a variable-speed drive unit 16 such as a motor. The screw feeder 14 extends through a guide cylinder or trough 12 attached by an attachment plate 17 to the barrel 2 of the tank 1 and has a flaring end 13 disposed in the tank 1 for introducing the material into the discharge unit 5. The guide cylinder 12 has a proximal end portion 18 remote from the flaring end 13 and having a discharge port 19 to which is connected a pipe 21 coupled through a discharge valve 20 with the conveyor pipe 10.

For discharging the material at a constant rate, the screw feeder 14 should preferably have its longitudinal axis extending at an angle of elevation with 60° with respect to the horizon as viewed from the distal end 15. If the screw feeder 14 extended at an angle of depression with respect to the horizon, the material could not be fed at a constant rate under the influence of gravity of the material and pressure under which the material is kept. With the angle of elevation selected to be greater than 60°, the material would tend to slip along the screw feeder 4 or the amount of slippage of the material would be increased.

Operation of the conveyor thus constructed is as follows: A gas discharge valve 23 is first opened to maintain the interior of the pressurization tank 1 under normal pressure, and then a charging valve 22 is opened to fill a powdery or granular material in the tank 1. After the material has been filled, the valves 22, 23 are closed and the valves 7, 9 are opened to increase the pressure in the tank 1 up to 2 $Kg/cm^2 \cdot G$ or higher. After the tank pressure has thus been increased, the conveyor valve 11 and the discharge valve 20 are opened and simultaneously the drive unit 16 is energized to rotate the screw feeder 14. When the screw feeder 14 rotates, the material as it is fluidized as a fluidized bed on the aerator 4 in the tank 1 is continuously fed from the distal end 15 into the guide cylinder 12, from which the material is supplied through the discharge valve 20 into the conveyor pipe 10. The pressure in the conveyor pipe 10 is the same as the pressure in the pressurization tank 1.

The amount of the material discharged is determined by the rate of flow of the gas supplied from the pressurization pipe 6 into the air chamber 3a, the configuration of the auger of the screw feeder 14, and RPM of the screw feeder 14. Since the auger of the screw feeder 14 is of a predetermined shape, the amount of the material discharged is normally governed by RPM of the screw feeder 14 and the amount of the gas supplied by the pressurization pipe 6. Experiments indicated that the constant-rate supply of the material is better when the screw feeder 14 rotates at lower speeds than when the screw feeder 14 rotates at higher speeds.

With the arrangement of the present invention, the powdery or granular material can be discharged by the screw feeder 14 accurately at a desired rate from the pressurization tank 1 continuously into the conveyor pipe 10. As an example, the constant-rate supply available with the conveyor of the present invention is subjected to a variation ranging from ±3 to ±6%, while a conventional conveyor discharges a powdery or granular material at a constant rate which varies about ±15%. Since the material flows continuously, but not intermittently, the conveyor of the invention is particularly suitable for use with apparatus in which the supplied material is continuously utilized or reacted. A variety of different powdery and granular materials can be conveyed by changing the configuration of the spiral of the screw feeder 14. One of applications best suited for the conveyor is as a conveyor for conveying a powdery or granular material of the kind which would tend to remain in the pressurization tank 1 with a pressurization gas only flowing therethrough into the conveyor pipe 10.

Figure 2:
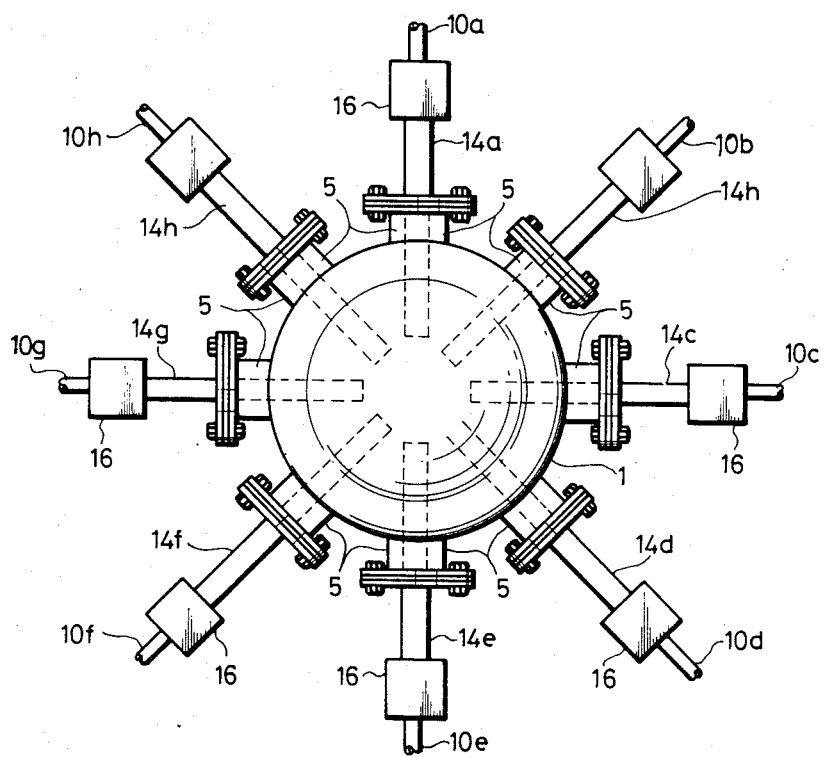
FIG. 2 is a plan view of a direct-distribution conveyor system utilizing the conveyor shown in FIG. 1.

A direct-distribution conveyor system shown in FIG. 2 comprises a plurality of discharge units 5 constructed as shown in FIG. 1 and having respective radial screw feeders 14a–14h, a common pressurization tank 1 to which the discharge units 5 are connected, and a plurality of conveyor pipes 10a–10h coupled respectively with the screw feeders 14a–14h. The direct-distribution conveyor system is advantageous in that the amount of the material discharged from the tank 1 can be adjusted independently of the difference between the pressure in the tank 1 and the pressure in the discharge port in the trough of each screw feeder. More specifically, the pressure in the discharge port varies from trough to trough as it is determined by the pressure loss in the conveyor pipe. The pressure in the tank 1 being constant, the difference between the inlet of the trough and the discharge port thereof varies from screw feeder to screw feeder, with the result that different amounts of the material will be discharged by the screw feeders. Such different amounts discharged can be equalized by adjusting RPM of the screw feeders dependent on the pressure difference in each screw feeder. Since the constant material supply is better with lower RPM of each screw feeder, design requirements may be determined for a certain range of constant supply by selecting one of the screw feeders which has greatest RPM as a reference and arranging the other screw feeders to operate at lower RPM.

With the conveyor system shown in FIG. 2, the powdery or granular material can uniformly or adjustably be distributed from the single pressurization tank to a plurality of locations at a constant rate which is subjected to a variation ranging from ±3 to ±6%. The direct distribution of the material from the single tank to the plurality of locations requires a smaller space of installation for the conveyor system and results in a less cost of construction of the conveyor system. Variations in the pressure loss in the conveyor tubes due to different lengths thereof can be adjusted by changing RPM of the screw feeders. Therefore, there are no limitations on the length of the conveyor pipes, and the conveyor system can be designed with greater leeway. Instead of uniform material distribution, the screw feeders may be operated to discharge the material in different amounts to the conveyor pipes.

The screw feeders 14a–14h may be connected to the tank 1 in parallel relation on one side of the tank rather than in the radial arrangement.

Although certain preferred embodiments have been shown and described, it should be understood that many changes and modifications may be made therein without departing from the scope of the appended claims.

What is claimed is:

1. A conveyor for conveying a powdery or granular material on a gas at a high pressure of 2 $Kg/cm^2G$ or higher, comprising:
   a pressurization tank having an aerator for storing the powdery or granular material therein;
   a plurality of discharge units each connected to said pressurization tank for directly distributing said material to different locations, each of said discharge units including a guide cylinder mounted on said pressurization tank and having a discharge port outside said tank and a flaring end projecting into said tank for introducing the material into said guide cylinder, and a screw feeder having a longitudinally extending intermediate portion coaxially disposed in said guide cylinder, a first end extending out of one end of said guide cylinder into said pressurization tank in overhanging relation to said aerator and a second end remote from said first end projecting out of the other end of said guide cylinder, each of said screw feeders including a first spiral blade portion on the upstream side of said discharge port and a second spiral blade portion the winding direction of which is opposite to that of said first blade portion on the downstream side of said discharge port;

a variable-speed drive unit coupled to said second end of each of said screw feeders for rotating the latter;

a conveyor pipe connected to each discharge port for conveying the material supplied from each discharge unit on the gas supplied to each conveyor pipe; and piping means connected to said tank and each of said conveyor pipes for supplying the gas into said tank above and below said aerator to fluidize the material under said high pressure and for supplying the gas into each of said conveyor pipes.

* * * * *